Figure 1:
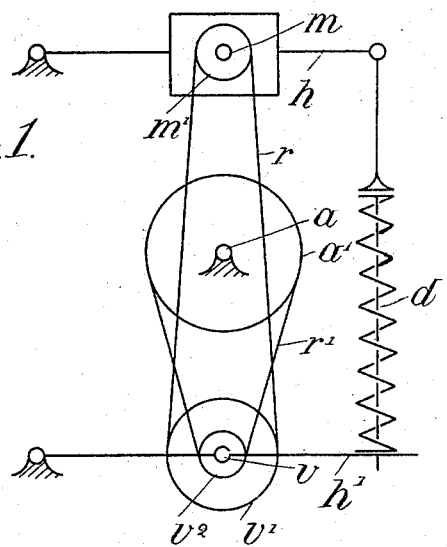

No. 752,778. PATENTED FEB. 23, 1904.
R. HUNDHAUSEN.
DRIVING GEAR.
APPLICATION FILED NOV. 28, 1902.
NO MODEL. 2 SHEETS—SHEET 1.

No. 752,778. Patented February 23, 1904.

UNITED STATES PATENT OFFICE.

RUDOLF HUNDHAUSEN, OF GRUNEWALD, GERMANY.

DRIVING-GEAR.

SPECIFICATION forming part of Letters Patent No. 752,778, dated February 23, 1904.

Application filed November 28, 1902. Serial No. 133,100. (No model.)

*To all whom it may concern:*

Be it known that I, RUDOLF HUNDHAUSEN, manager, a subject of the King of Prussia, German Emperor, residing at 41 Humboldtstrasse, Grunewald, near Berlin, Kingdom of Prussia, and German Empire, have invented a certain new and useful Improvement in Driving-Gears, of which the following is a specification.

This invention has reference to driving-gears having a driving-shaft, a driven shaft, and an intermediate or counter shaft, and where the transmission of movement is effected by friction-gears—such as by means of belts, ropes, friction-wheels, or the like—any suitable ratio of speed between the driving and the driven shaft being obtained. The invention refers particularly to an arrangement of this kind where the counter or intermediate shaft and one of the two other shafts are supported in movable journals, so as to be able to vary their respective distance from each other and from the stationarily-supported shaft, and in which the weight of the driving-gear and of one of the movable shafts combined are utilized to secure the engagement of the friction-gear interposed between the counter-shaft and the stationarily-supported shaft, while, on the other hand, the friction-gear interposed between the counter-shaft and the other movable shaft is kept in engagement by a spring which counteracts the weight of the latter shaft and of the parts connected thereto.

My invention is shown on the accompanying drawings diagrammatically in four modifications illustrative of embodiments of my invention where power is transmitted from an electric-motor engine to a slowly-rotating working engine.

In the drawings, $m$ is the rapidly-rotating shaft of the electric-motor engine.

$a$ is the slowly-driven rotating shaft.

$v$ is the shaft of the driving-gear.

In the modification shown in Figure 1 a pulley $m'$ is mounted upon the shaft $m$. A larger pulley $v'$ is mounted upon the shaft $v$. The belt $r$ is taken around these two pulleys. Another pulley $v^2$ is mounted upon the shaft $v$, and a corresponding larger pulley $a'$ is mounted upon the shaft $a$, and the belt $r'$ is taken around the pulleys $v^2 a'$. The shafts $m$ and $v$ are journaled in the lever-arms $h h'$, which are made to rock on a stationary axis each and which are kept separated from each other by a compression-spring $d$. In the position shown in the drawings the belt $r'$ is kept taut by the combined weights of the driving-gear shaft $v$ and of the parts connected thereto ($v' v^2 h$) and the weight of the motor-engine and the parts connected thereto, while the belt $r$ is kept taut only by the force of the spring $d$, provided the same is able to overcome the weight of the motor-engine.

Figure 2:
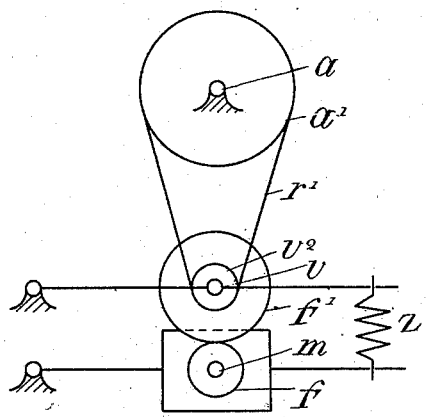

In the modification shown in Fig. 2 the transmission of power from the motor-shaft $m$ to the driving-gear shaft $v$ is effected by a pair of friction-wheels $f f'$, which are compressed by a tensile spring $z$.

Figure 3:
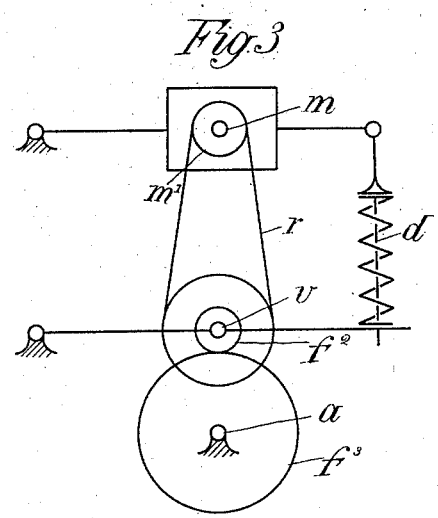

In the modification of Fig. 3 a pair of friction-wheels $f^2 f^3$, a compression-spring $d$, as shown in the drawings, are made use of instead of a driving-belt between the shafts $v$ and $a$.

Figure 4:
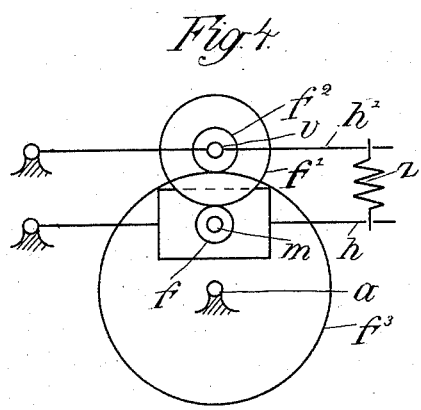

In Fig. 4 there are two pairs of friction-wheels $f f' f^2 f^3$ and a tensile spring $z$.

In the three last-mentioned modifications the engagement of the friction-gear between $a$ and $v$ is secured by the combined weights of the shafts $v$ and $m$, while the engagement between the shafts $m$ and $v$ is only secured by the difference of the spring action of $d$ or $z$, respectively, and of the weight $m$.

In all these modifications, which are illustrative of the application of the invention, there are pressing means operating in connection with the supports for securing the engagement of the friction-gears, and these pressing means include in the different embodiments tension-springs, compression-springs, and weight of parts arranged and coöperating with the other parts to produce the effect according to the particular embodiment of the invention.

What I claim, and desire to secure by Letters Patent of the United States, is—

1. A driving-gear arrangement comprising a stationarily-supported shaft, a counter-shaft and movable journals or supports for said counter-shaft, a third shaft and movable journals or supports for said third shaft, a friction-gear between the first shaft and the counter-shaft, and a friction-gear between the counter-shaft and the said third shaft, in combination with pressing means for securing the engagement of the friction-gears.

2. A driving-gear arrangement comprising a stationarily-supported shaft, a counter-shaft and movable journals or supports for said counter-shaft, a third shaft and movable journals or supports for said third shaft, a friction-gear between the first shaft and the counter-shaft, and a friction-gear between the counter-shaft and the said third shaft, in combination with a spring between the movable journals and arranged so as to secure the engagement of the friction-gear between said third shaft and the counter-shaft.

3. A driving-gear arrangement comprising a stationarily-supported shaft, a counter-shaft and movable supports for said counter-shaft, a third shaft and movable journals or supports for said third shaft, a friction-gear between the first shaft and the counter-shaft and a friction-gear between the counter-shaft and the said third shaft, in combination with a spring between the movable journals and arranged so as to counteract the weight of the said third shaft and of the parts connected thereto.

4. In a driving-gear arrangement, the combination of three shafts, one being a driving and one being a driven shaft and one being a counter-shaft, two of the shafts being movably journaled, an electric engine connected to one of said movably-journaled shafts, and a spring interposed between the movably-journaled shafts and arranged so as to counteract the weight of the engine and of the parts connected thereto.

In witness whereof I have hereunto signed my name in the presence of two subscribing witnesses.

RUDOLF HUNDHAUSEN.

Witnesses:
KARL HULLBAUER,
HENRY HASPER.